United States Patent [19]

Lee et al.

[11] Patent Number: 5,526,059
[45] Date of Patent: Jun. 11, 1996

[54] WHITE BALANCE CORRECTION CIRCUIT OF A COLOR IMAGE RECEIVING TUBE

[75] Inventors: Chan-koo Lee; Bong-ki An, both of Suwon, Rep. of Korea

[73] Assignee: Samsung Electronics Co., Ltd., Kyungki-Do, Rep. of Korea

[21] Appl. No.: 262,868

[22] Filed: Jun. 21, 1994

[30]     Foreign Application Priority Data

Jun. 21, 1993 [KR]  Rep. of Korea ...................... 93-10947

[51] Int. Cl.$^6$ .............................. H04N 9/73; H04N 9/69
[52] U.S. Cl. ............................ 348/655; 348/656; 348/675
[58] Field of Search .................................... 348/655, 656, 348/675; H04N 9/69

[56]             References Cited

U.S. PATENT DOCUMENTS

| | | | |
|---|---|---|---|
| 4,127,868 | 11/1978 | Nagaoka et al. | 348/656 |
| 4,547,797 | 10/1985 | Mick | 348/655 |
| 5,260,774 | 11/1993 | Takayama | 348/655 |
| 5,267,026 | 11/1993 | Kawahara et al. | 348/655 |
| 5,283,635 | 2/1994 | Suzuki et al. | 348/655 |
| 5,315,378 | 5/1994 | Satou et al. | 348/655 |
| 5,361,093 | 11/1994 | Yamamoto et al. | 348/656 |
| 5,402,182 | 3/1995 | Sugiura | 348/655 |

FOREIGN PATENT DOCUMENTS

| | | | |
|---|---|---|---|
| 0050480 | 3/1986 | Japan | H04N 9/73 |
| 4298189 | 10/1992 | Japan | H04N 9/64 |

*Primary Examiner*—Victor R. Kostak
*Attorney, Agent, or Firm*—Sughrue, Mion, Zinn, Macpeak & Seas

[57]              ABSTRACT

A white balance correction circuit corrects the signal level of red and blue video signals. The circuit includes both active elements and passive elements which cooperate in generating different bias resistances according to a signal level of an input color signal component. The gain of the respective transistor which ultimately amplifies and outputs each of the color signals advantageously can be varied by varying the bias of the transistor according to the signal level of the input color signal. As a result, the circuit minimizes deviation between the gamma characteristics of the red, green and blue video signals. Accordingly, a constant white balance can be maintained irrespective of the signal level of input video signals. The circuitry thus permits excellent reproduction of the original colors on the screen or tube.

8 Claims, 2 Drawing Sheets

WHITE BALANCE CORRECTION CIRCUIT OF A COLOR IMAGE RECEIVING TUBE

BACKGROUND OF THE INVENTION

1. Field of the Invention

The present invention relates to a white balance correction circuit of a color image receiving tube in which the gamma characteristics of three electron guns provided within the color image receiving tube which emit red (R), green (G) and blue (B) video signals, are maintained in agreement to thereby maintain white balance.

2. Description of Related Art

Generally, white balance refers to reproducing achromatic images by an additive matrix process with respect to red (R), green (G) and blue (B) colors. In the case of the color image receiving tube having three electron guns, there needs to be control of the operation of R, G and B electron guns or the magnitude of respective video signals due to variations in the luminous efficiency of the phosphors associated with the scanning of each electron gun. Incomplete control can not bring about high quality colored images for reproduction. Therefore, in order to reproduce beautifully colored images, there is a need to correct a color difference signal or a color signal, achieving the picture quality correction by noise removal, contour compensation, black-level correction, gamma correction (which is referred to as intermediate luminance correction), etc.

FIG. 1 shows a curve representing the gamma characteristics of the R, G and B electron guns in a color image receiving tube. In FIG. 1, a horizontal axis depicts to a voltage applied to the control grid of the color image receiving tube, while the vertical axis shows luminous outputs in terms of percentage. When a color signal of a specified voltage is supplied to the color image receiving tube, a luminous quantity is changed according to the luminous characteristics of the color image receiving tube. Such an electro-photic conversion characteristic is referred to as the gamma characteristic, which signifies luminous quantity when an electric signal supplied to electron guns produces an emission as a respective electronic beam. Referring to FIG. 1, in the case that luminous quantities are respectively a first level L1 of 25% and a second level L2 of 75%, luminous efficiency with respect to the three color signals agrees, thereby permitting an acceptable white balance. However, when the voltage level is between the first level L1 and second level L2, luminous efficiency for the green color signal G is higher than that of the red and blue color signals R and B. Accordingly, it is difficult to reproduce a clear colored image because the white balance is now inclined toward the green side.

A delta type of color image receiving tube which has a triangular arrangement of electron guns, is formed so as to permit control of the voltages supplied to the control grid and screen grid for each electron gun. When the electron guns show luminous quantities similar to those of FIG. 1, the white balance can be adjusted by the control of the voltages provided to the control grid and screen grid.

In contrast, an in-line type of color image receiving tube, which has three electron guns arranged in series employs a self-convergence method for maintaining white balance. The format wherein the control grid and screen grid are united with electron guns provides a simple construction and permits a reduction of voltage consumption owing to low deflection voltages. However, since the in-line type of the color image receiving tube can not control the voltages of the control grid and screen grid associated with the electron guns, this configuration has a drawback that the white balance of the video signal is often broken.

Japanese Patent No. 4-298189 was published on Oct. 21, 1992 and discloses a prior art device for stabilizing the white balance under control of the gamma characteristics of the three colors. The prior art discloses a technology whereby the gamma characteristics with respect to the three primary colors are maintained in agreement using a digital-gamma correction circuit having a ROM table.

SUMMARY OF THE INVENTION

Therefore, to solve the above problems, it is an object of the present invention to provide a white balance correction circuit for a color image receiving tube which reversely compensates driving voltages supplied to red and blue electron guns having low luminous efficiencies compared with a green electron gun, so that the gamma characteristics of red, green and blue video signals are maintained in agreement thereby always maintaining a good white balance irrespective of the level of electric video signals provided to the electron guns.

This and other objects, features and advantages according to the present invention, is provided by a white balance correction circuit for controlling the white balance of a color image receiving tube which displays red, green and blue video signals using three electron guns. The apparatus includes:

control signal generation means for generating first and second control signals so that the gamma characteristics of the red (R), green (G) and blue (B) video signals are in accord, in response to the respective signal levels of the red and the blue video signals input from an exterior source;

a first driving signal generator for correcting a first gamma characteristic of the red video signal according to the first control signal, and generating a first driving signal so as to drive the red gun responsive to a corrected first gamma characteristic; and a second driving signal generator for correcting a second gamma characteristic of the blue video signal according to the second control signal, and generating a second driving signal so as to drive the blue gun, responsive to a corrected second gamma characteristic.

BRIEF DESCRIPTION OF THE DRAWINGS

The preferred embodiment is described with reference to the drawing in which.

DETAILED DESCRIPTION OF THE PREFERRED EMBODIMENT

A preferred embodiment of the present invention will be described below in more detail with reference to the accompanying drawings.

Figure 2:
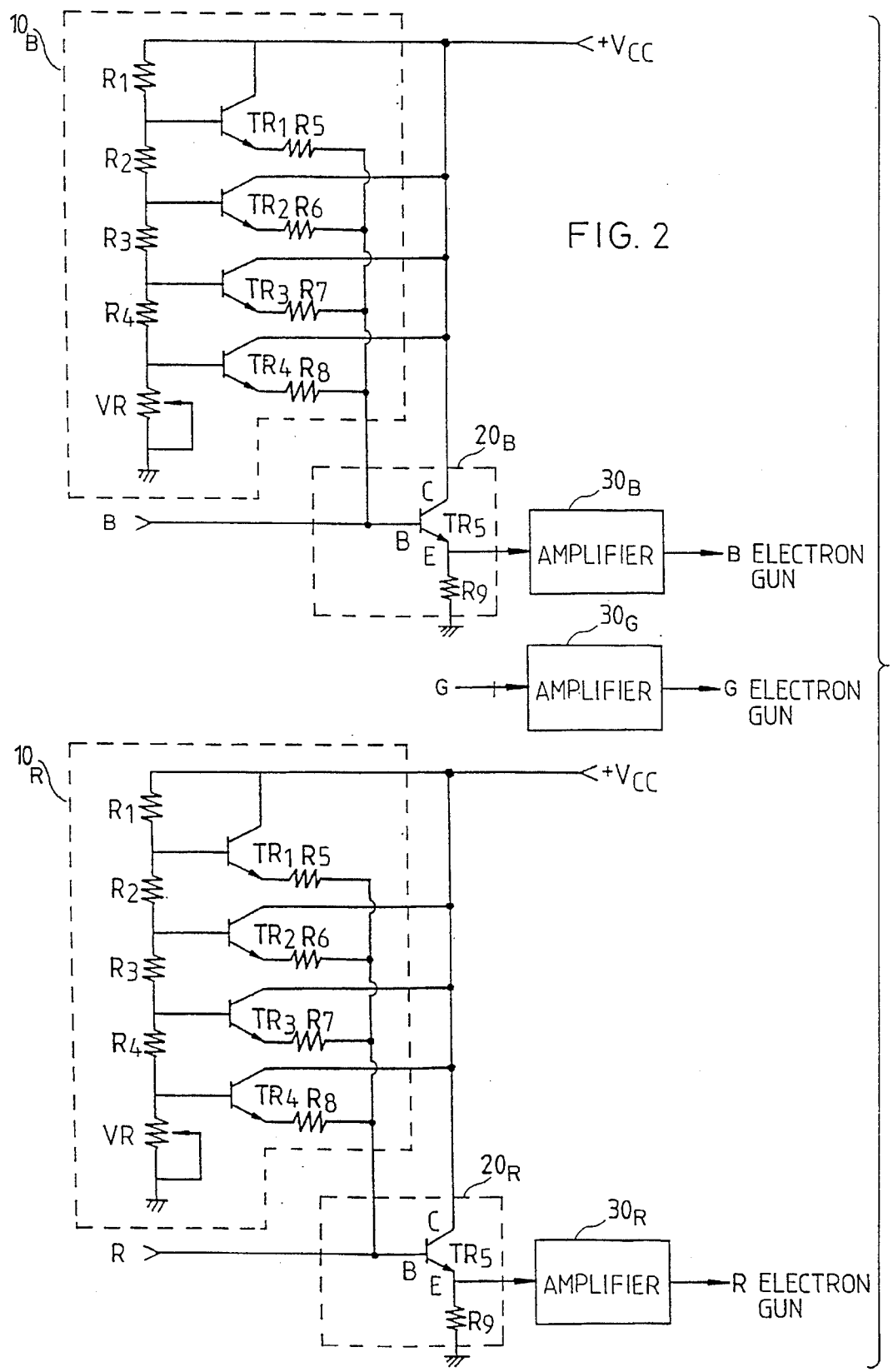
FIG. 2 is a circuit diagram showing white balance correction in a color image receiving tube in accordance with the present invention.

FIG. 2 shows a white balance correction circuit for each or R and B electron guns a color image receiving tube in accordance with the present invention. The apparatus of FIG. 2 comprises a control signal generator generally denoted 10, a driving signal generator generally denoted 20 and an amplifier illustrated or 30. A respective external source 100 is connected to a corresponding driving signal generator 20. An output signal of the amplifier 30 is supplied to respective electron guns to generate electron beams for displaying the red color or blue color video signals. A preferred embodiment of the present invention employs only circuitry for gamma correcting respective red and blue video signals since the use of such circuitry in conjunction with a green video signal may make the correction at a voltage level area where non-linearity occurs more difficult. It will be appreciated that the apparatus of FIG. 2 which generates a driving signal for gamma correction uses the same circuit construction for both red and blue colors video signals, thus, only the apparatus for electrically processing the red video signal will be described below.

Referring to FIG. 2, the control signal generator 10 is composed of four NPN type transistors TR1, TR2, TR3 and TR4. Voltage+Vcc is supplied to each collector of the four transistors TR1, TR2, TR3 and TR4. Each base of transistors TR1, TR2, TR3 and TR4 is connected to respective resistors R1, R2, R3 and R4. The emitter of each transistor TR1, TR2, TR3 and TR4 is connected to resistors R5, R6, R7 and R8. Between the base of the fourth transistor TR4 and ground is a variable resistor VR, which turns ON/OFF the transistors TR1, TR2, TR3 and TR4. The four transistors TR1, TR2, TR3 and TR4 are cut off in order of TR4→TR3→TR2→TR1 by changing of the associated resistance of variable resistor VR.

The driving signal generator 20 comprises an NPN type transistor TR5 which receives a red video signal RA at its base. The transistor TR5 also receives the voltage+Vcc supplied to the collectors of the transistors TR1, TR2, TR3 and TR4. The base of transistor T5 is connected to the emitter of the transistors TR1, TR2, TR3 and TR4 via respective resistors R5, R6, R7 and R8, and receives the red video signal RA from an exterior source. The emitter of the transistor TR5 is grounded via a resistor R9. An input terminal of the amplifier 30 is connected between the emitter of transistor TR5 and the resistor R9. The output signal RB of amplifier 30 is supplied to the red gun (not shown).

Figure 1:
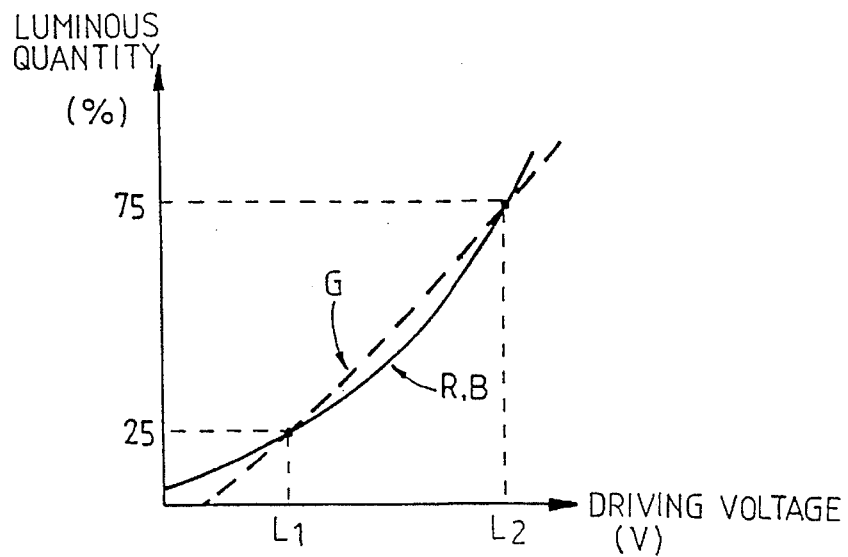
FIG. 1 shows a curve representing the gamma characteristics of R, G and B electron guns of a color image receiving tube.
Figures 3A, 3B:
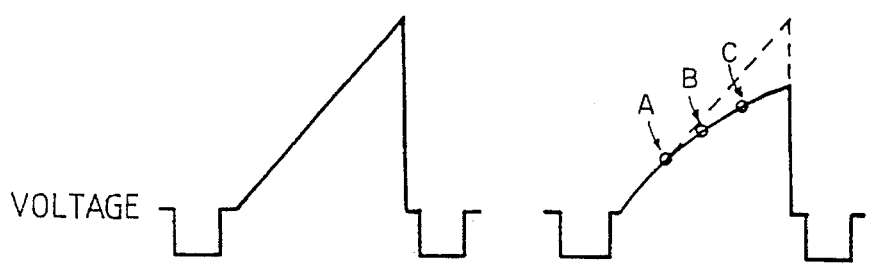
FIGS. 3A and 3B are voltage waveforms which are useful in illustrating operation of the FIG. 2 circuit.

FIG. 3A shows a waveform of the red video signal RA supplied to the FIG. 2 circuit, and FIG. 3B shows a waveform of the red video signal RB output from the FIG. 2 circuit.

Referring to FIG. 2, the transistors TR1, TR2, TR3 and TR4 within the control signal generator 10 are previously set up to be kept in the 'ON' state during the period in which the red video signal is not supplied. The resistance value of variable resistor VR is fixed in advance so that the slope of a bias voltage of the transistor TR5 is fixed. Reverse characteristics for compensating the gamma characteristics according to setting of the variable resistor advantageously can be determined.

When the red video signal RA in the waveform of FIG. 3A is supplied to the driving signal generator 20 from the exterior circuit (not shown), the transistors TR1, TR2, TR3 and TR4 of the control signal generator 10 are cut off in order, e.g., TR4→TR3→TR2→TR1, by changing of a resistance value of variable resistor VR. Accordingly, in the case that the voltage level of the red video signal RA is increasing as shown in FIG. 3A, bias current which is supplied to the base of the transistor TR5 is continuously decreased, as shown in FIG. 3B, by the transistors TR1, TR2, TR3 and TR4. The moment the fourth transistor TR4 is cut off, the driving signal generator 20 outputs a red video signal with the voltage level of 'A' to the amplifier 30. The generator 20 outputs a red video signal with the voltage level of 'B' when the third transistor TR3 is cut off, and a red video signal with the voltage level of 'C' when the second transistor TR2 is cut off. As a result, a signal output from the emitter of the fifth transistor TR5 gets involved in a slope corresponding to a variation rate of bias by the transistors TR1, TR2, TR3 and TR4.

An output signal of the driving signal generator 20 is supplied to the amplifier 30 in which the applied signal is amplified to a signal level suitable for use in the electron gun. The output RB of the amplifier 30 is provided to a red electron gun and used to produce electronic beams for displaying the red video signal.

Figure 4:
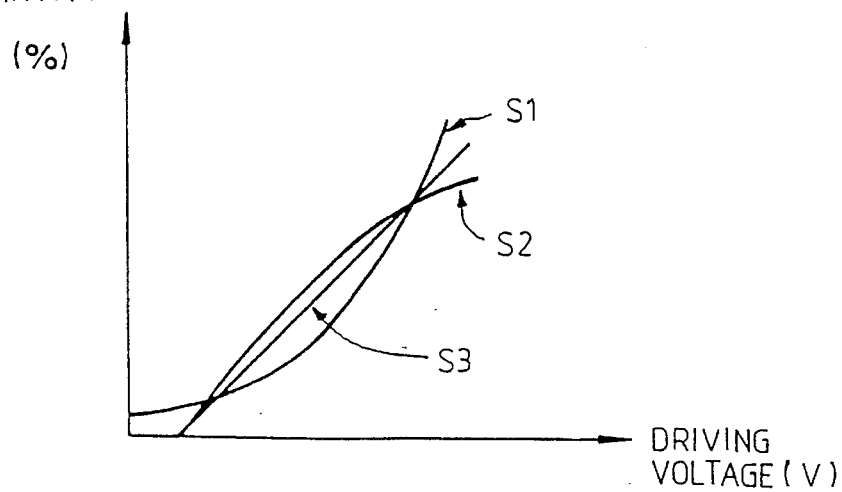
FIG. 4 shows a curve representing the gamma characteristics of R, G and B electron guns in a color image receiving tube signal-corrected by the circuit of FIG. 2.

FIG. 4 shows curves representing the signal-corrected gamma characteristics produced by the circuit of FIG. 2. Curve S1 shows the gamma characteristic of the color image receiving tube for respective red and blue video signals. Curve S2 shows the case wherein a signal is changed in the circuit of FIG. 2 is electric-photo converted to match an ideal electron gun. Curve S3 shows a gamma characteristic for the red and blue video signals corrected by the circuit of FIG. 2 actually supplied to electron guns.

As described above, a white balance correction circuit of a color image receiving tube in accordance with the present invention corrects the level of red and blue video signals to thereby minimize deviations in the gamma characteristics associated with respective red, green and blue video signals. Accordingly, the apparatus can maintain a constant white balance irrespective of the signal level of respective input video signals, and thereby reproduce excellent original colors on the screen.

While only certain embodiments of the invention have been specifically described herein, it will be apparent that numerous modifications may be made thereto without departing from the spirit and scope of the invention.

What is claimed is:

1. A white balance correction circuit for controlling the white balance of a color image receiving tube which displays red, green and blue (RGB) video signals, using respective red, green and blue electron guns, said green one of said RGB video signal having no gamma correction applied thereto, said circuit comprising:

control signal generation means for generating first and second control signals so as to permit maintenance of substantial agreement between the gamma characteristics of said RGB video signals in accordance with the respective signal level of red and blue video signals input from an external RGB video signal source;

a first driving signal generator for correcting a first gamma characteristic of said red video signal according to said first control signal, and generating a first driving signal so as to drive the red electron gun, responsive to a corrected first gamma characteristic; and a second driving signal generator for correcting a second gamma characteristic of said blue video signal according to said second control signal, and generating a second driving signal so as to drive the blue electron gun, responsive to a corrected second gamma characteristic.

2. The white balance correction circuit as claimed in claim 1, wherein said control signal generation means outputs said first and said second control signals in substantially similar signal form.

3. The white balance correction circuit as claimed in claim 2, wherein said control signal generation means comprises:

a first control signal generator for generating said first control signal so that a first reverse-gamma characteristic of said red electron gun is applied to control said first driving signal; and a second control signal generator for generating said second control signal so that a second reverse-gamma characteristic of said blue electron gun is applied to control said second driving signal.

4. The white balance correction circuit as claimed in claim 3, wherein both of said first and said second control signal generators comprises a variation means, individually responsive to signal levels of respective input color signals, for generating a plurality of bias resistance values.

5. The white balance correction circuit as claimed in claim 4, wherein both of said control signal generators further comprises a variable resistor for applying respectively different gamma characteristics to each of the color signals.

6. The white balance correction circuit as claimed in claim 4, wherein both of said driving signal generators comprises a respective transistor which receives via an associated base a voltage of a respective color signal which vary according to respective control signals of said control signal generators, so as to amplify and output a voltage applied to the collector, responsive to the voltage supplied via said base.

7. A white balance correction apparatus for controlling the white balance of a color image receiving tube receiving red, green and blue (RGB) video signals from an external RGB video signal source and displaying red and blue gamma corrected and green uncorrected video signals using respective red, green and blue electron guns, said apparatus comprising:

a first white balance correction circuit receiving a red uncorrected video signal and generating said red gamma corrected video signal; and a second white balance correction circuit receiving a blue uncorrected video signal and generating said blue gamma corrected video signal;

wherein both of said first and said second white balance correction circuits cooperate with the other to maintain white balance in said RGB video signal, and wherein both of said first and said second white balance correction circuits comprises:

control signal generation means for generating a control signal representing a gamma characteristic in response to a signal level of a respective one of said uncorrected video signals received from the external RGB video signal source;

driving signal generator means for correcting a gamma characteristic associated with the respective one of said video signals in response to a respective said control signal, and for generating a driving signal for application to a respective one of said electron guns.

8. The white balance correction means as recited in claim 7, wherein said signal generation means comprises:

first and second terminals connected to a power source and ground, respectively;

first through fourth resistors and a variable resistor serially connected to one another between said first and second terminals; and first through fourth transistors emitter-coupled to a first node by fifth through eighth resistors, respectively, and collector-coupled to a second node maintained at a first terminal potential, wherein associated bases of said transistors are connected between said first and second resistors, said second and said third resistors, said third and said fourth resistors and said fourth and said variable resistors, respectively, wherein said signal level of the respective one of said uncorrected video signals received from the external RGB video signal source is applied to said first node, and wherein said driving signal generator means receives said first terminal potential via said second node.

* * * * *